(12) United States Patent
Natarajan

(10) Patent No.: US 11,758,353 B1
(45) Date of Patent: Sep. 12, 2023

(54) RAPIDLY CUSTOMIZABLE GEOFENCE NOTIFICATION SYSTEM AND METHOD

(71) Applicant: Sundaram Natarajan, Fremont, CA (US)

(72) Inventor: Sundaram Natarajan, Fremont, CA (US)

( * ) Notice: Subject to any disclaimer, the term of this patent is extended or adjusted under 35 U.S.C. 154(b) by 0 days.

(21) Appl. No.: 17/838,197

(22) Filed: Jun. 11, 2022

(51) Int. Cl.
| | |
|---|---|
| *H04W 4/021* | (2018.01) |
| *G06F 16/29* | (2019.01) |
| *G06Q 30/0207* | (2023.01) |
| *G06F 3/04883* | (2022.01) |

(52) U.S. Cl.
CPC ........ *H04W 4/021* (2013.01); *G06F 3/04883* (2013.01); *G06F 16/29* (2019.01); *G06Q 30/0207* (2013.01)

(58) Field of Classification Search
CPC ............ H04W 4/021–022; G06F 16/29; G06F 3/048; G06F 3/04883; G06Q 30/0207–0239
See application file for complete search history.

(56) References Cited

U.S. PATENT DOCUMENTS

| | | | |
|---|---|---|---|
| 8,971,930 B2 | 3/2015 | Li et al. | |
| 8,983,497 B2 | 3/2015 | Zizkind et al. | |
| 9,549,286 B2 | 1/2017 | Birch et al. | |
| 2003/0130890 A1* | 7/2003 | Banerjee ............ | G06Q 30/0277 705/14.69 |
| 2011/0306304 A1* | 12/2011 | Forutanpour ..... | H04M 1/72457 455/67.11 |
| 2015/0020081 A1* | 1/2015 | Cho ................... | H04M 1/72436 719/318 |
| 2015/0081207 A1* | 3/2015 | Briant .................. | H04W 4/023 701/410 |
| 2015/0269624 A1* | 9/2015 | Cheng ................ | G06Q 30/0261 705/14.58 |
| 2016/0007151 A1* | 1/2016 | Birch .................... | H04W 4/021 455/456.3 |
| 2018/0113594 A1* | 4/2018 | Alnatsheh ............. | H04L 67/131 |
| 2018/0352374 A1* | 12/2018 | Ball .................... | G06F 16/9537 |

OTHER PUBLICATIONS

Queatz. "Tiiight: Offline Reminders and Notes". Nov. 11, 2020. Google Play. <https://play.google.com/store/apps/details?id=com.queatz.tiiight&hl=en_IE&gl=US> (Year: 2020).*

* cited by examiner

*Primary Examiner* — Liang Y Li
(74) *Attorney, Agent, or Firm* — Stephen E. Zweig

(57) ABSTRACT

A privacy enhanced system and method of using a handheld computerized device to store and retrieve geofence based notifications, without requiring that any of the specific geofenced regions or notifications be reported on a remote server. The system enables the user to both manually draw the desired geofences on the device's touchscreen, as well as directly load the geofence associated notifications (such as various images) into the device in advance. Other constraints and executable code can also be input and associated as desired. In use, the system automatically triggers when its location sensors detect that the device is within a geofenced region, and if the constraints are satisfied, can automatically retrieve the desired notifications. In some embodiments, the system can use previously stored executable code to automatically generate additional geofence regions and notifications.

17 Claims, 10 Drawing Sheets

FIG. 3
FIG. 4
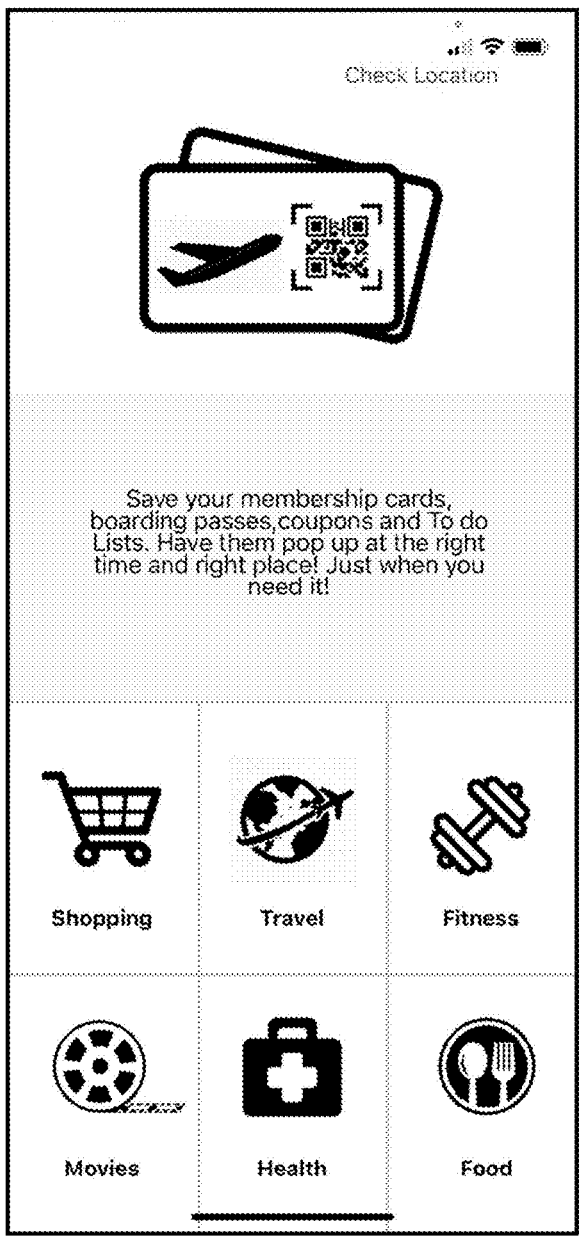
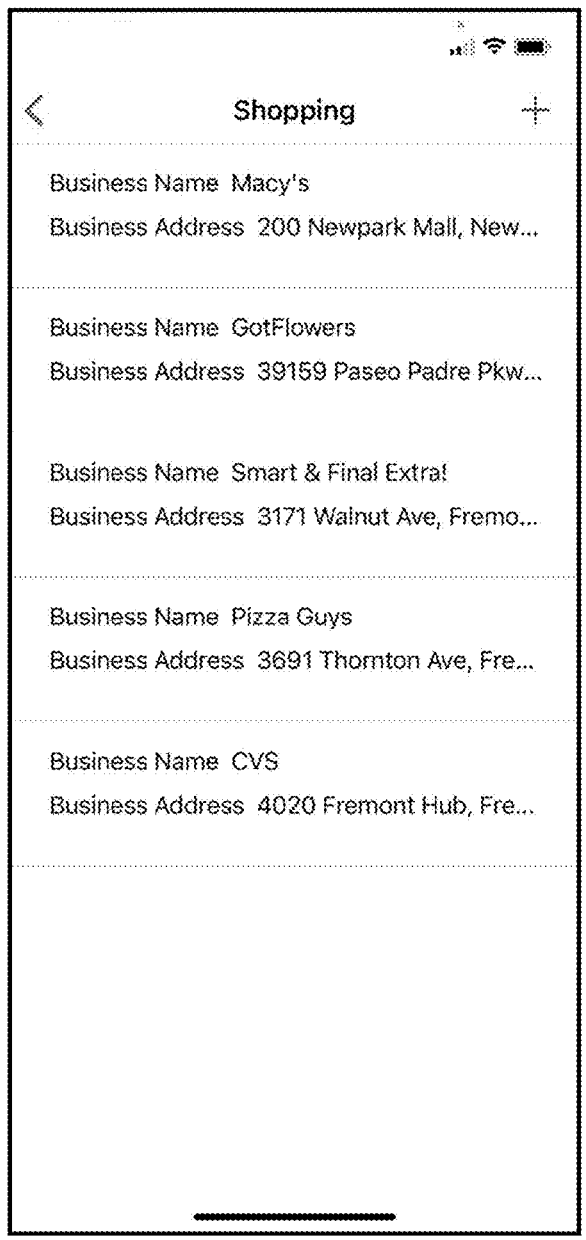

FIG. 5
FIG. 6
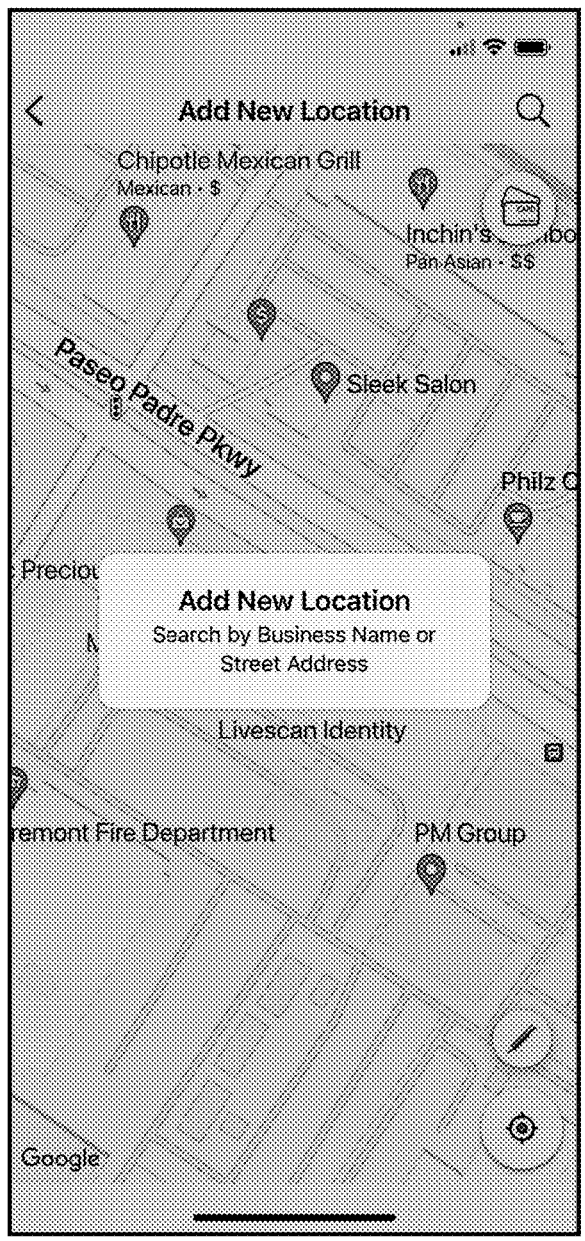
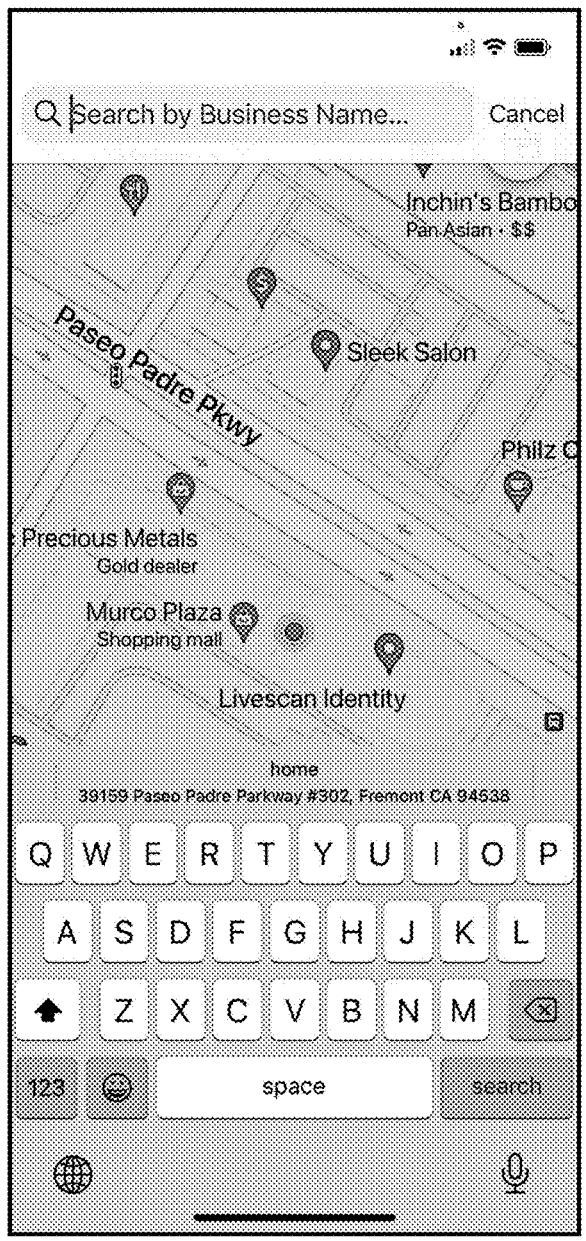

FIG. 7
FIG. 8
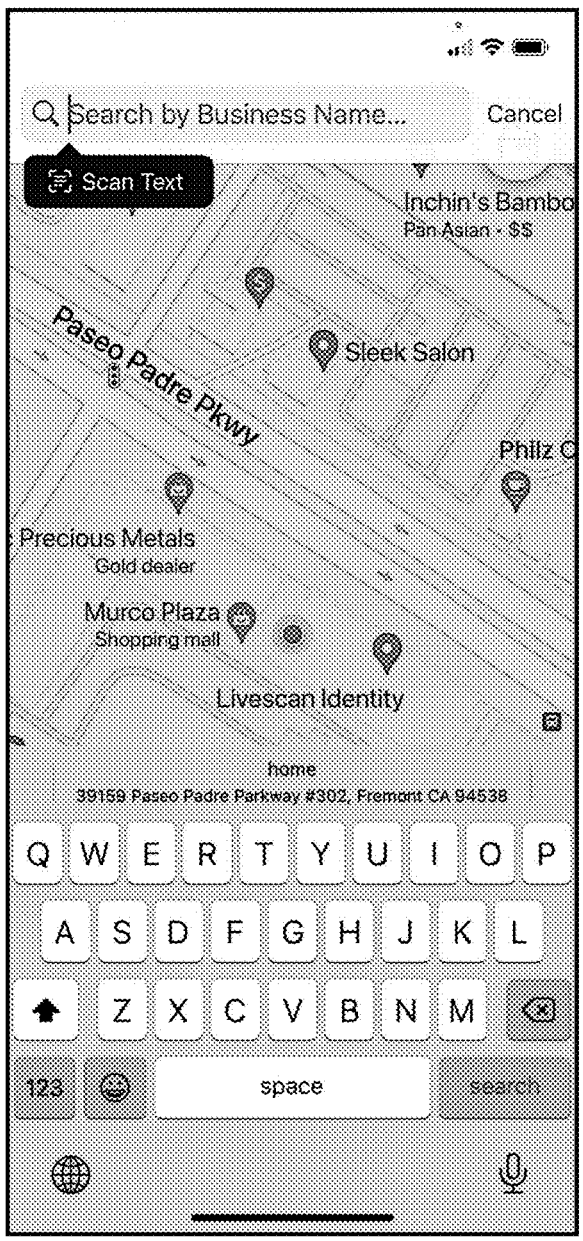
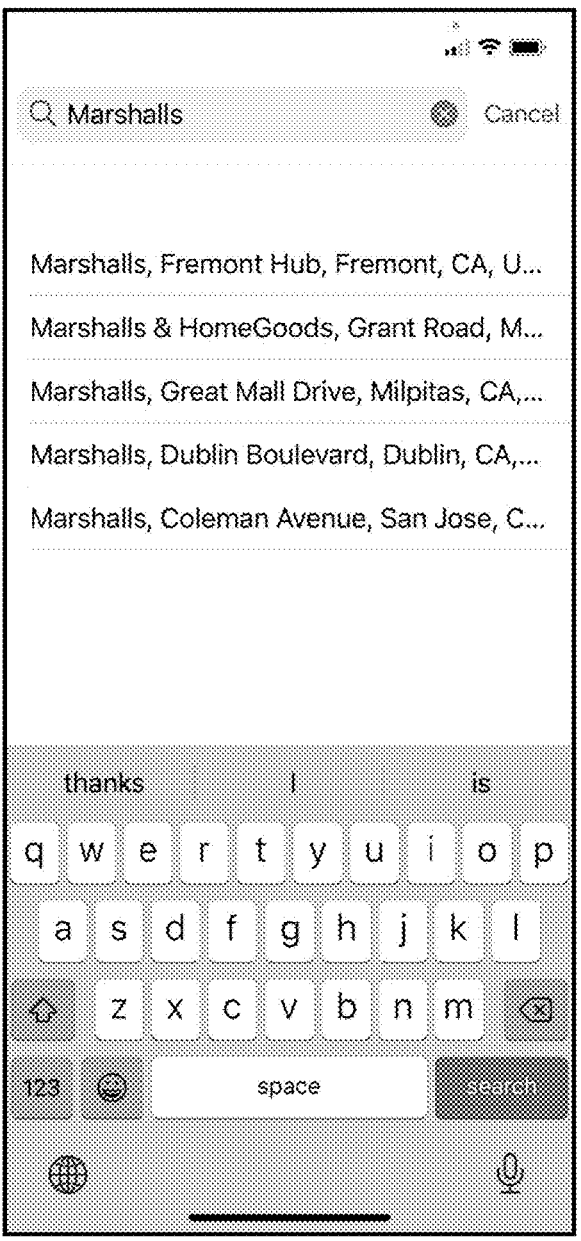

FIG. 11
FIG. 12
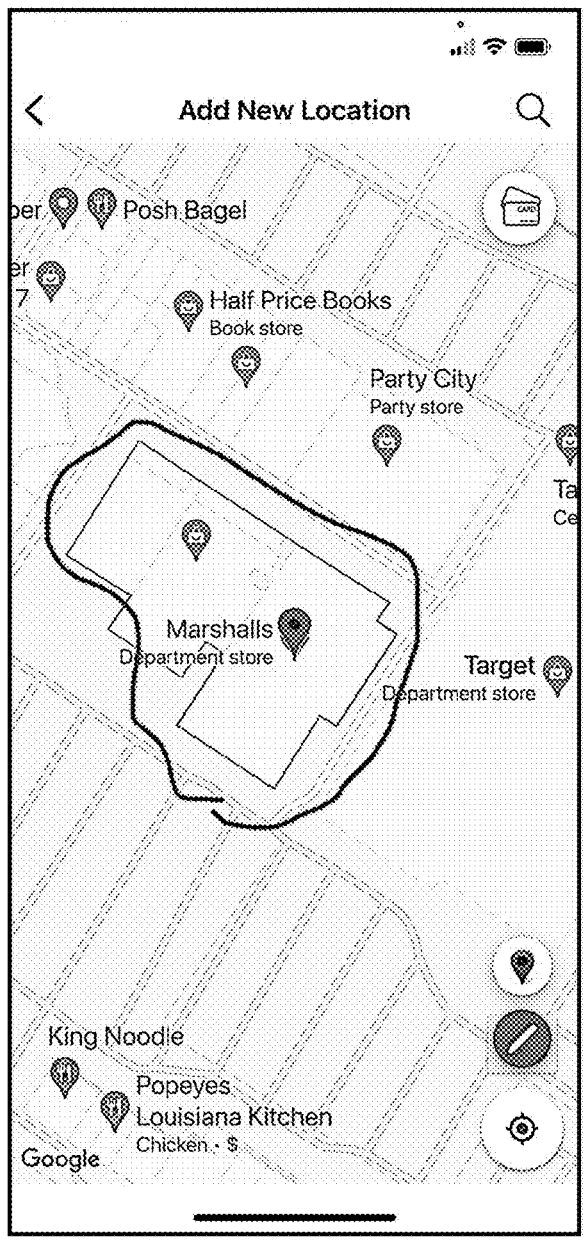
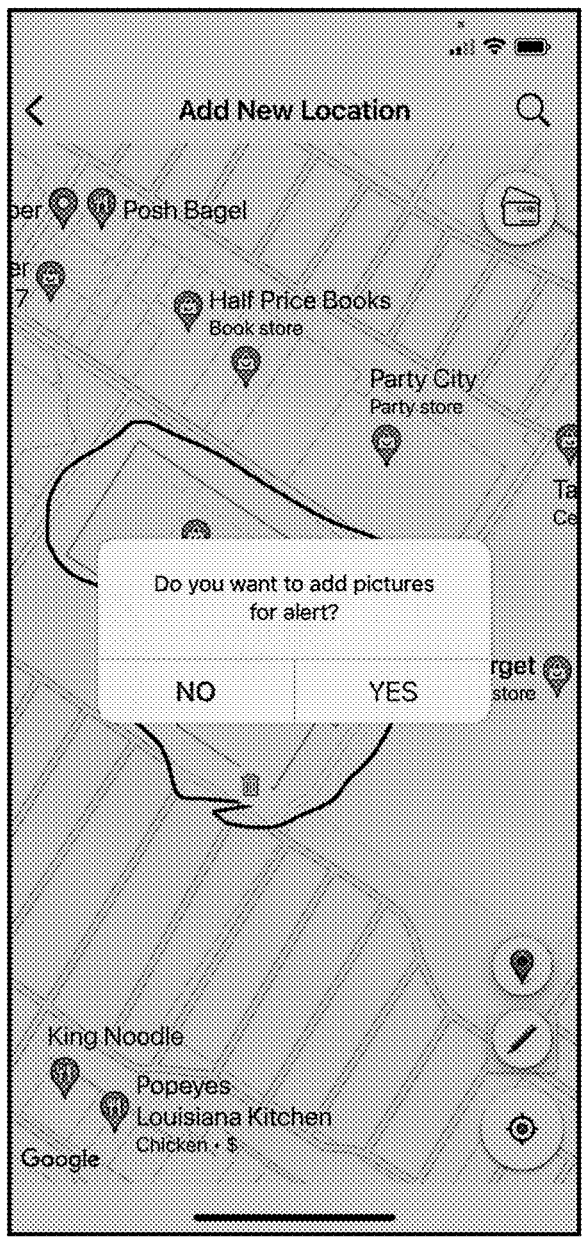

FIG. 13
FIG. 14
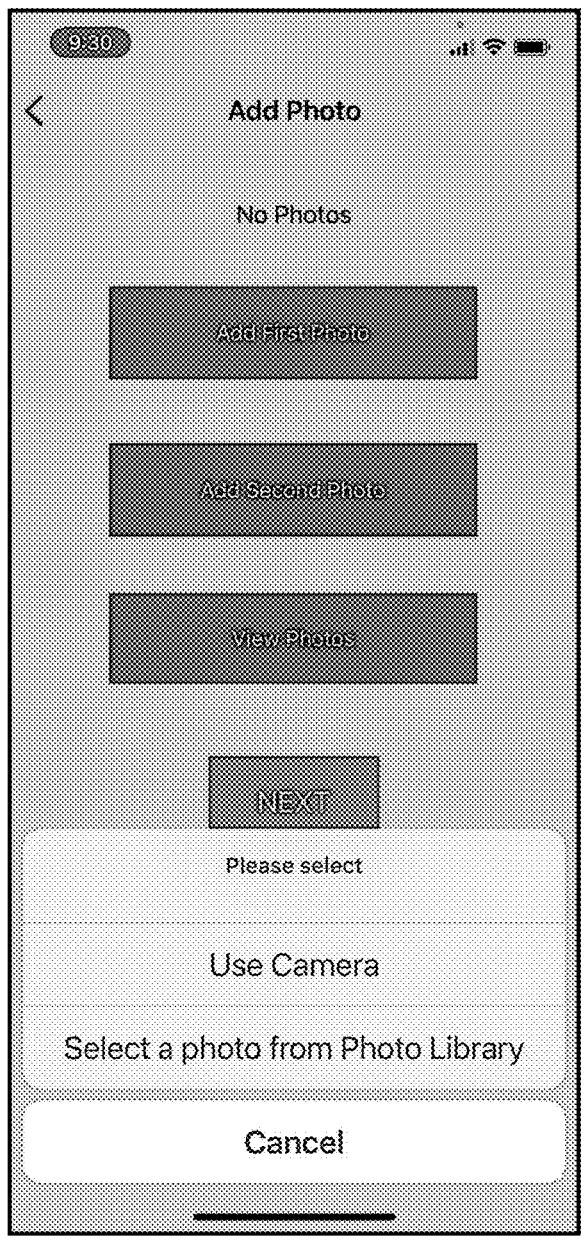

FIG. 15
FIG. 16
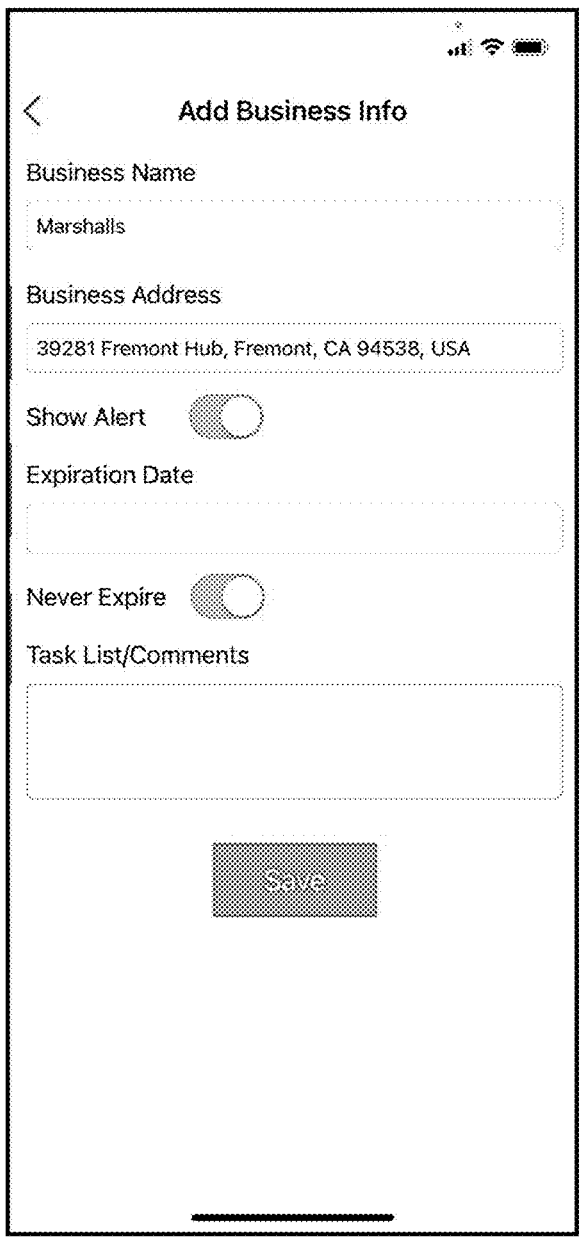
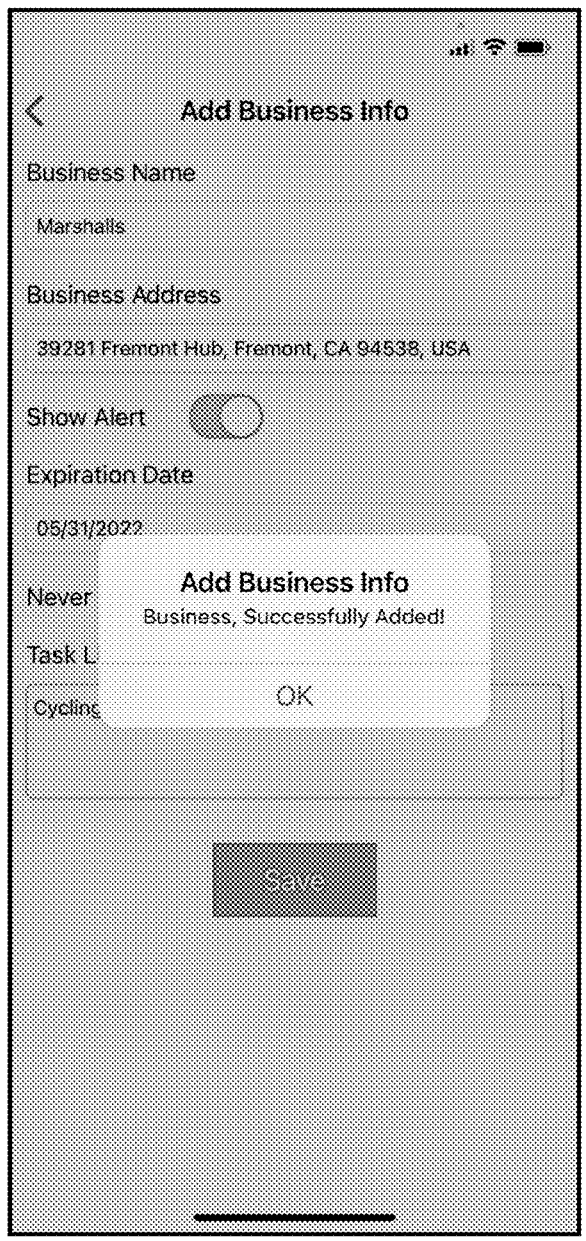

FIG. 17
FIG. 18
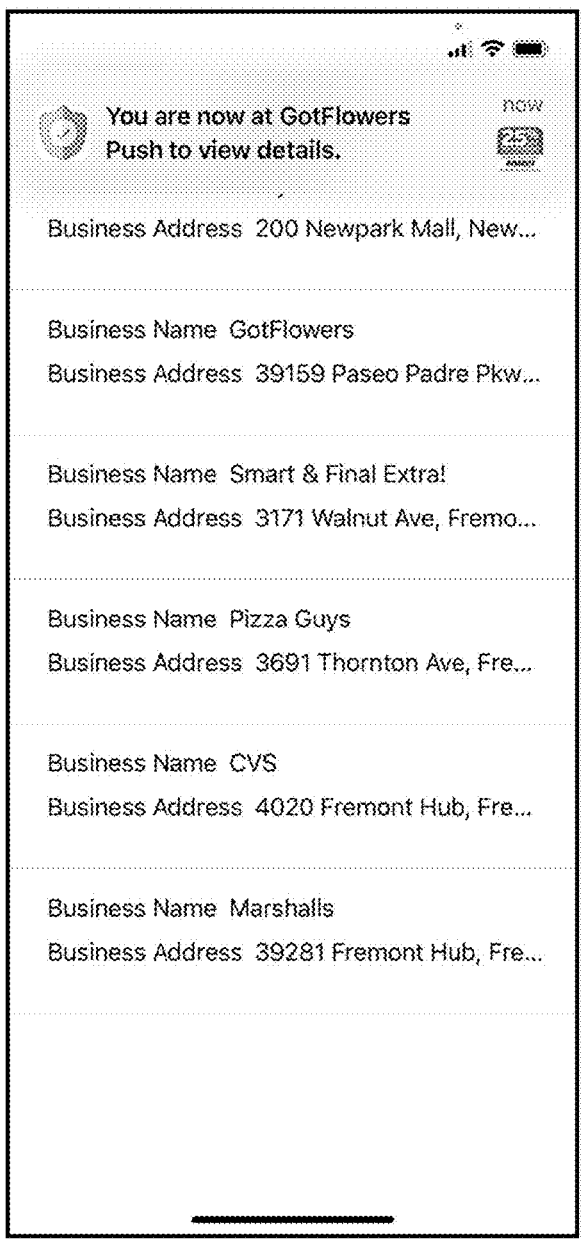

RAPIDLY CUSTOMIZABLE GEOFENCE NOTIFICATION SYSTEM AND METHOD

BACKGROUND OF THE INVENTION

Field of the Invention

This invention is in the field of systems and methods for automatically dispensing data according to the geographic position of the user.

Description of the Related Art

Location based notification systems are used for many technical and commercial purposes. Internet websites have hardware and software configured to automatically estimate a web browser's approximate location by using various cues, such as the web browser's URL address, cookies, browsing history, and the like to estimate the location of the web browser. The websites are then configured to use this location information to automatically customize the content to the approximate location of the web browser.

Similarly, various types of location-based notification system exist. For example, Birch, et. al., in U.S. Pat. No. 9,549,286 describe a mobile device based geo-fence notification system that can track the location of the smartphone, determine if the smartphone has entered a geofenced area by polling a remote geo-fence server, and if the mobile device exists in the geofenced area for longer than a present period of time, present a predetermined notification.

Similarly, Ziskind and McKechney, in U.S. Pat. No. 8,983,497 describe a computer implemented method of defining a geofenced area, determining a trigger, and if the trigger is met, downloading information from a remote server.

Li et. al, in U.S. Pat. No. 8,971,930 describe a Geofencing system and method that can store a plurality of geofences in memory, receiving current location data, and if the current location data is within a given geofence, then obtaining data from one or remote servers and performing subsequent actions according to this downloaded data.

The complete contents of U.S. Pat. Nos. 9,549,286; 8,983,497; and 8,971,930 are incorporated herein by reference.

Various commercially based smartphone apps, such as ibotta, Rakuten, Coupons.com, Groupon also exist that are commercially popular, and several also offer location-based services.

BRIEF SUMMARY OF THE INVENTION

The invention is based, in part, on the insight that modern smartphones and other handheld computerized devices, such as the Apple iOS system, now incorporate enhanced user privacy features that limit the ability for the system to automatically contact remote servers without prior user authorization.

The invention is also based, in part, on the insight that smartphone users frequently have to routinely provide information when they reach a given destination. For example, a subscriber to a gym may have to routinely provide a gym membership card every time they reach a gym. This membership card is not a coupon, but is often a visual image that may have various bar codes. Such membership cards are often provided by small businesses that lack the resources to do much more than provide printed cards for their customers.

The invention is also based, in part, on the insight that what is needed is an easy-to-use software app that can allow an average user to store all sorts of information, typically images, on their smartphone. The app should also allow the user to easily create and store geofences, such as the location around a gym, in smartphone memory. Then, when the system detects that it is within a user defined geofence region, the app should, without needing to contact a remote server (thus not creating any privacy issues, and also improving response time) provide the previously stored information. This information will often be in the form of one or more images.

In some embodiments, the system is designed so that all information, including the various geofence regions and the various notification data (such as images) can be entered by the user. Thus, the user can set various geofence locations, and then store whatever information they anticipate may be useful at a given location. This can include store coupons, airline tickets, fitness clubs, membership cards, movie tickets, reminder lists, and the like. The system in turn will deliver "just in time" alerts when the user arrives at a previously set geofenced location.

The system will typically be configured to store any information that the user can photograph or download. This is typically any type of visual or audio information as desired. In some embodiments, all information, including geofences and the various notifications, are all entered by the user. As a result, in contrast to prior art systems, where the notifications are usually broadcast by the merchants without user authorization, the present system enables user authorized notifications. Indeed, in some embodiments, the user may set the system so that only user authorized notifications are enabled.

In some alternative embodiments, the system may also use various automated or artificial intelligence techniques to keep track of user preferences, and use geofence associated code to automatically generate additional coupons consistent with a history of user preferences. For example, if the system automatically determines that a user tends to shop at pizza restaurants, with appropriate user permissions, the system may then automatically generate pizza coupons and dispense them when the user approaches a new pizza restaurant. Again, with appropriate permissions, the system may then automatically transmit this AI generated coupon information to third party websites, such as Facebook (Meta) or Google, which can aggregate this information for other purposes.

BRIEF DESCRIPTION OF THE DRAWINGS

FIG. 3 shows an example of an initial startup screen of the system, here implemented as a smartphone app.

FIG. 4 shows one method of loading a map of a geographic area of interest onto the system's touch sensitive display screen.

FIG. 5 shows an alternative process of loading a map of a geographic area of interest. Here the user can be prompted to enter a relevant address or name, and the system may then query a remote map server to obtain relevant map data.

FIG. 6 shows how the system may provide a keypad on its touch sensitive display screen to receive text input for the relevant address or name of interest.

FIG. 7 shows how alternatively, the system may further comprise a video camera, and the system may be configured to obtain the text input by imaging an address of interest, and then performing optical character recognition on this image.

FIG. 8 shows an example of the user inputting the name of a retail store, here "Marshalls" on the keypad. The system can return a list of possible candidates and, when appropriate, the user can then touch select a location of interest from the list. The system can then automatically retrieve the map of this selected geographic area of interest from the remote server.

FIG. 11 shows how the user has used an electronic pencil or fingertip to input the boundaries of a manually drawn geofenced region. Here the curve is almost closed.

FIG. 12 shows how the user has now closed the curve from FIG. 9. The system has entered this geofenced region, and is now automatically asking the user if the user wishes to input some specific notification data to associate with this particular geofenced region.

FIG. 13 shows how the system gives the user the option to input various types of location specific notification data, such as image data (here one or more photographs) to then associate (in memory) with that particular geofenced region.

FIG. 14 shows how in some embodiments, the system can then allow the user to select the notification data from a video library previously stored in memory.

FIG. 15 shows how after the user has selected a particular image (here a photograph of a coupon) to store as the notification data for this geofenced region, the system then allows the user to further input optional time constraints, such as what is the earliest time this notification should be shown, and how long this notification should be shown. User comments can also be added.

FIG. 16 shows how after the optional time constraints and user comments have been added, the system will then automatically notify the user that it has associated these time-constraints and user comments with that specific geofenced region in memory.

FIG. 17 shows that when the system determines that it is now located within one of the previously geofenced regions that are also associated with notification data, the system will check the associated time constraints, when the time constraints are also satisfied, the system will then output that relevant notification data is available.

FIG. 18 shows that, at least upon further user inquiry, the system can then provide the notification data image previously stored in memory. In this example, the image is a time limited coupon, and the coupon image also contains a one-dimensional bar code.

DETAILED DESCRIPTION OF THE INVENTION

Figure 1:
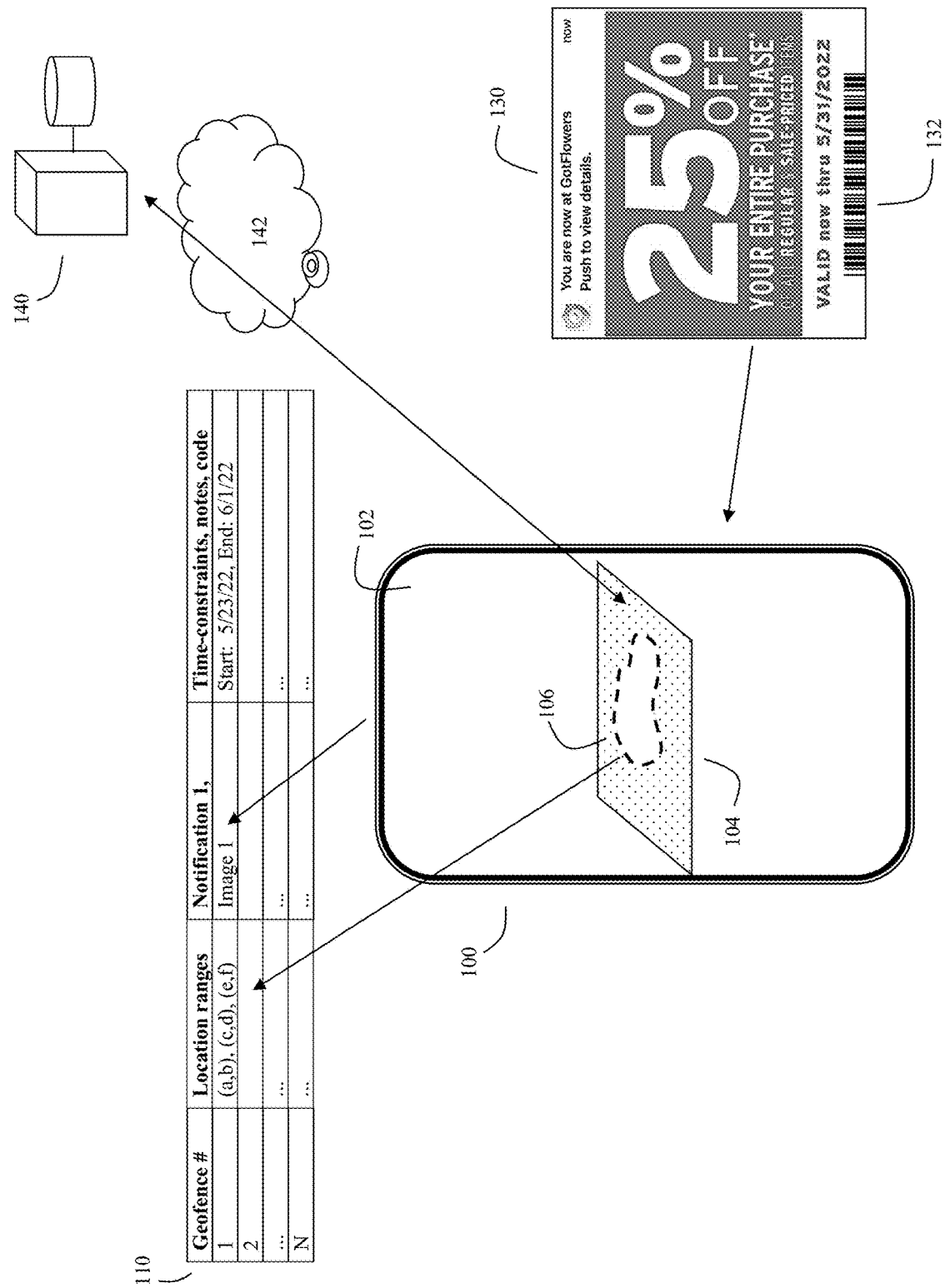
FIG. 1 shows a diagram showing how the system can be initially configured.

In some embodiments, the invention may be a computerized system or method of providing location-based notifications. This is typically implemented on a portable (usually handheld) computerized device comprising at least one processor, computer memory, touch-sensitive display screen, a clock-calendar, and at least one location sensor. Examples of such handheld computerized devices include smartphones, such as the popular iOS or Android series of smartphones. Other similarly equipped devices, such as tablet computers, watch computers (such as the popular Apple iWatch series), or laptop computers may also be used.

Although the location sensor may often be based on global positioning system (GPS) receivers, other location determining methods may also be used. These can include radio signal triangulation methods using any of cellular towers, local Wi-Fi transceivers, other wireless beacons, or other sources with known locations.

The invention is optimized for flexibility and ease of use. This flexibility is achieved by configuring the system to be easily customized by the human user of the handheld computerized device (here, for conciseness, we will often use the term "smartphone" or "device" as a shorthand for such handheld computerized devices). In particular, the invention allows the user to have a high degree of control over what constitutes a proper location for the notification, the proper time for the notification, and the content of the notification.

The system enables the user to precisely set various (e.g., at least one, and often a plurality of) different geographic notification zones. In a preferred embodiment, the system will do this by first displaying a map of a geographic area of interest on the device's touch-sensitive display screen. This map corresponds to a geographic area comprising a plurality of map coordinates. The device processor and memory will be configured with a mapping algorithm that enables the device to correlate a particular (e.g., X, Y) coordinate on the display screen with a corresponding geographic location (e.g., latitude and longitude, street address, etc.). Although, in some embodiments, the system will assume that all altitudes correspond to the altitude of the local ground level, in some embodiments, the system may be configured to all entry of local height levels, and to allow the user to specify a certain height level for the notification as well. In these examples, however, we will focus on a default "altitude is local ground altitude" embodiment.

Here, the system enables the (human) user to enter in a flexible notification zone by accepting (human) user input, using the touch-sensitive display screen (touchscreen), and said at least one processor, of at least at least one geofenced region. This input consists of a closed curve shape, determining boundaries of at least one manually drawn geofenced region on said map, that is manually drawn by the user. The device is configured to utilize the algorithm that maps coordinates on the touchscreen with geographic locations, so that the manually drawn closed curve thus can be mapped into a similarly shaped (although much larger scale) closed curve defining the corresponding coordinates on the geographic map that is being displayed on the device's display screen. The system thus uses its at least one processor, the closed curve shape, and at least some of said map coordinates to store the boundaries of said at least one geofenced region in the system memory.

Although often the system memory will be the computer memory located onboard the handheld computerized device, in some embodiments, some of the geofenced regions may be offloaded to remote server memory (for example, using cellular or Wi-Fi connections and networks), and then retrieved from the remote server memory when needed. Thus, a user might store one set of geofenced regions for one city, a different set of geofenced regions for a different city, and the system might reduce local memory use by offloading the remote city's geofenced regions to a remote server, and then later retrieving these geofenced regions, as needed.

Various methods may be used to store the map of the geographic area comprising a plurality of map coordinates and a mapping algorithm into the device's memory. This information may be factory entered into memory, loaded into memory via direct download, scanning, or by other type of memory transfer. However, since useful maps require a lot of storage data, and need continual updating as real-world map features change, in a preferred embodiment, the system will be configured to download this data from a remote server. Such servers are provided by various companies, exemplified by the Google Maps Platform API.

For example, in some embodiments, the system may be configured to either use the user's present location, a user input address, or user designated location on a lower-resolution map displayed by the device to load a higher resolution map of the desired area. More specifically, the system may use the at least processor (e.g., the device processor) and the device's touch sensitive display screen to (for example) receive text input pertaining to any of an address or geographical location. The system can then use this text input to retrieve said map.

More specifically, in this embodiment, the handheld computerized device may further comprise any of a cellular or Wi-Fi transceiver. Here the at least one processor can use this text input, the cellular or Wi-Fi transceiver, and the internet, to query a remote map server for map data, and to retrieve this map from the remote map server. This is shown in FIG. 1, and also FIG. 3 to FIG. 8

FIG. 1 shows a diagram showing how the system can be initially configured. There the system's handheld computerized device (smartphone 100) can initially obtain map data from a remote server (140) over the internet (142), and display a representation of this map data (104) on the device's touch-sensitive display screen (102). A user can hand draw a closed curve (106) on the map (104) that the system will interpret to then correspond to a geofence over a portion of this displayed map data.

In some embodiments, the system's handheld computerized device can also obtain additional data from the remote server at this step. This can include information pertaining to the identity of various map locations, along with computer readable code pertaining to some of these map locations. This computer readable code can, for example, include instructions for the handheld computerized device's at least one processor to run in the event that that map location is subsequently geofenced by the user, and the handheld computerized device subsequently detects that it is act that location. This computer readable code can, with appropriate user permissions, be used for other operations, such as accumulating statistics on the user's visits to these locations, and even automatically generating notifications for future visits to that location, or other location as designated by the computer readable code. In some embodiments, the user entered image used for notification purposes may itself contain this computer readable code in the form of a two-dimensional bar code, such as a QR code. This way, for example, a chain of related stores in the area may distribute a coupon for users to photograph and enter that itself contains the computer readable code for multiple geofenced regions, each surrounding one of the local chain stores. Other information may also be provided, which (in a preferred embodiment, with the appropriate user permissions) may be read or executed as desired.

Chart (110) corresponds to locations between particular geofences, their geographic locations, notifications associated with a given geofence, and other information, such as notification time constraints, user notes, and the like. These are all stored in memory, often the computer memory of handheld device (100), but optionally also in server memory (120).

The system's processor uses the previously discussed mapping algorithm to translate these hand-drawn coordinates (106) into actual geographic locations and store this in memory (for example, as a series of map coordinates (a, b), (c, d), (e, f) and so on that define the perimeter of the geofence. Alternatively, the system may store these coordinates as an algorithm describing the shape and size of the geofence, along with a location coordinate describing the location of that particular geofence. Other schemes may also be used. Here, however, the outline of the perimeter is easier to show. Thus, in this scheme, geofence 1 has a perimeter defined by points (a, b), (c, d), (e, f), which the system can then connect by any of lines or curves to define the perimeter of geofence 1. Note that although at least some geofences will be defined by a user entered closed curve, not all geofences need to be defined by this method.

FIG. 1 also shows that the user may also enter notification data, such as an image (130), into the system. This can be done by various methods to be described shortly. The system (usually smartphone 100), and the system will associate this notification data (here image 130), along with other data such as time constraints or other notes, in memory (110) associated with that particular geofenced region (in this example, Geofence 1). In a preferred embodiment, the system is designed to accommodate multiple geofenced regions (for example, geofence 1, 2, . . . N) and provide multiple location-based notifications.

Note that although 130 shows an example of an image of a coupon as an example of one type of notification, note that the notifications are not limited to commercial purposes. Many types of non-commercial notification data, and non-commercial images, may also be used. In this example, image (130) also contains a bar code (132). In some embodiments, this bar code may further encode computer executable code that the system processor can automatically scan and subsequently execute. By using two-dimensional bar codes, such as QR codes, approximately kilobyte-sized chunks of executable code may be directly entered into the system when a user photographs a ticket or coupon, or other target. In principle, any type of code or information may be entered this way, although again, in the preferred embodiment, user permission will be required before using this code.

Note further that in in some embodiments, the system may be implemented as a smartphone app. FIG. 3 shows an initial startup screen for such a smartphone app. Here the icons give examples of various types of location-based notifications, which can be used for various useful purposes.

FIG. 4 shows the process of loading a map of a geographic area of interest onto the system's touch sensitive display screen. In an optional preliminary step, the user can select an approximate geographic area by, for example, selecting the street location of a business of interest from a pre-populated list.

FIG. 5 shows an alternative process of loading a map of a geographic area of interest. Here the user can be prompted to enter a relevant address or name, and the system may query a remote map server to obtain relevant map data.

FIG. 6 shows how the system may provide a keypad on its touch sensitive display screen to receive text input for the relevant address or name of interest.

FIG. 7 shows how alternatively, the system may further comprise a video camera, and the system may be configured to obtain the text input by imaging an address of interest, and then performing optical character recognition on this image.

FIG. 8 shows an example of the user inputting the name of a retail store, here "Marshalls" on the keypad. Often the system will contain a location sensor, such as a GPS sensor. In some default modes, the system can be configured to transmit the user's present location, and the text input, to a remote server (140) and query for locations of interest near the user's present location that match the text input. The system can return a list of possible candidates and, when appropriate, the user can then touch select a location of interest from the list. The system can then automatically retrieve the map (104) of this selected geographic area of interest from the remote server.

In either event, once the map and corresponding display screen coordinates to geographic coordinates map algorithm is loaded into the device's memory, and the user has inputted the location specific notification data (such as notification data image 130), the system will use its least one processor to associate, in memory (110), at least some of the location specific notification data (such as image 130) with at least some of said geofenced regions (such as geofence 1) in memory (110).

Additionally, for at least some of the various location specific notification data (such as image 130), the system can further its at least one processor and touch-sensitive screen (102) to input other data such as time constraints, and to also associate these time constraints (or other data) with the location specific notification data. Thus, for example, in FIG. 1, in memory (110), the row corresponding to Geofence #1 graphically shows the association in memory between geofence 1, the location ranges (perimeters) of this particular geofence, the associated notification image (image 1, 130), and other parameters such as start and ending time constraints. In practice, the device memory may used structured memory locations, pointers, and other hardware or software or database conventions to maintain these associations.

Figure 9:
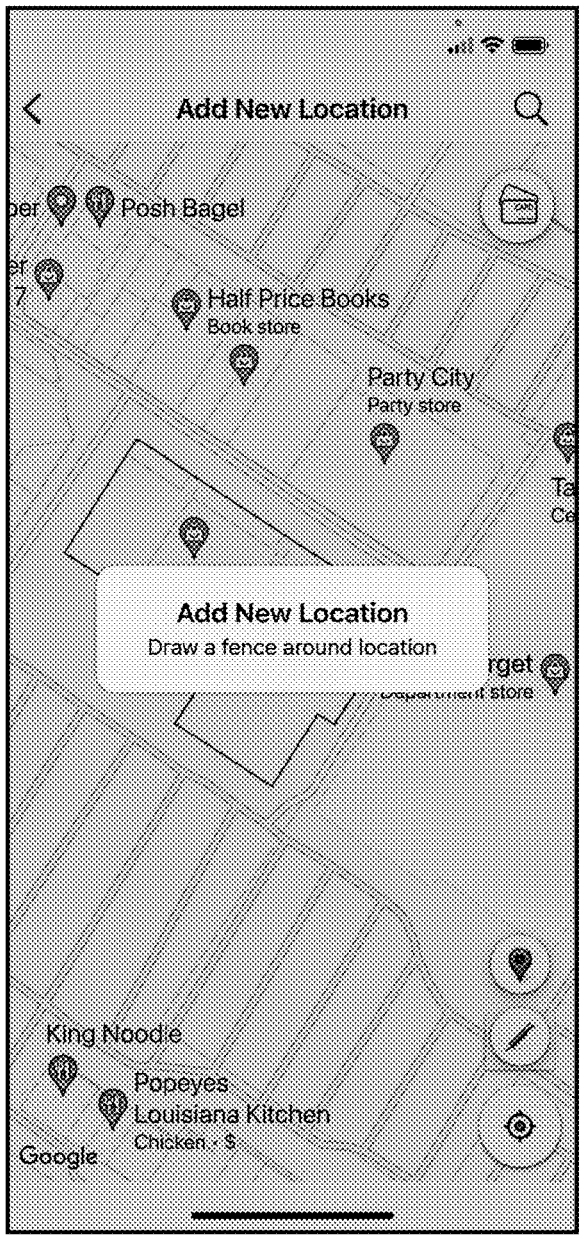
FIG. 9 shows how the system can then prompt the user to manually draw a closed curve shape to determine the boundaries of a manually drawn geofenced region on this map. Note that the "pencil" icon is not yet highlighted.

FIG. 9 shows how the system can then prompt the user to manually draw a closed curve shape to determine the boundaries of a manually drawn geofenced region on this map. Note that the "pencil" icon is not yet highlighted.

Figure 10:
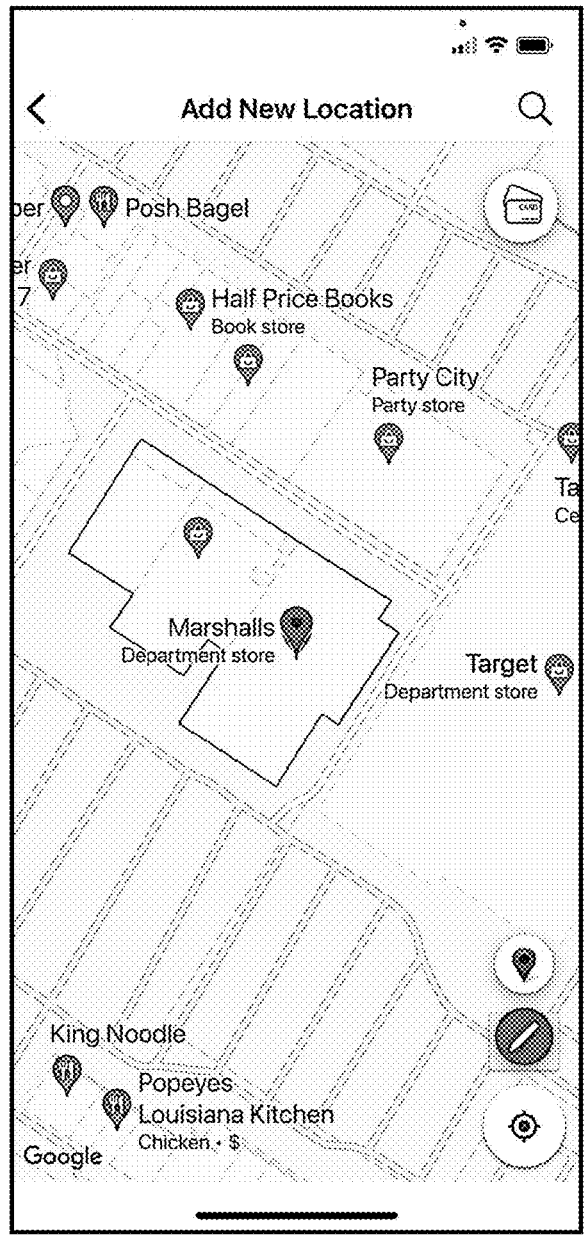
FIG. 10 shows how the user can press to highlight the "pencil" icon, to inform the system that the next touchscreen input is likely going to be the boundaries of this manually drawn geofenced region.

FIG. 10 shows how the user can press to highlight the "pencil" icon, to inform the system that the next touchscreen input is likely going to be the boundaries of this manually drawn geofenced region.

FIG. 11 shows how the user has used an electronic pencil or fingertip to input the boundaries of a manually drawn geofenced region. Here the curve is almost closed.

FIG. 12 shows how the user has now closed the curve from FIG. 9. The system has entered this geofenced region, and is now automatically asking the user if the user wishes to input some specific notification data to associate with this particular geofenced region. Here the system is assuming that the notification data will be at least one picture (image data).

FIG. 13 shows how the system gives the user the option to input various types of location specific notification data, such as image data (here one or more photographs) to then associate (in memory) with that particular geofenced region. The system gives the user various options for this, such as direct camera input or photos from video libraries.

FIG. 14 shows how in some embodiments, the system can then allow the user to select the notification data from a video library previously stored in memory.

FIG. 15 shows how after the user has selected a particular image (here a photograph of a coupon) to store as the notification data for this geofenced region, the system then allows the user to further input optional time constraints, such as what is the earliest time this notification should be shown, and how long this notification should be shown. User comments can also be added.

FIG. 16 shows how after the optional time constraints and user comments have been added, the system will then automatically notify the user that it has associated these time-constraints and user comments with that specific geofenced region in memory.

The notification data, such as image (130) may be obtained by various alternative methods. In some embodiments, such as when the handheld computerized device (100) further comprises at least one video camera, the system can use the device's at least one processor and it's at least one video camera to obtain said notification data. Thus, the user might directly photograph an image, such as a coupon (130), and tell the system to use this as the notification data.

Alternatively, such as when the handheld computerized device (100) further comprises any of a cellular or Wi-Fi transceiver, the handheld computerized device can further be directed to use its least one processor, cellular or Wi-Fi transceiver, and the internet (142) to obtain said notification data from a remote server (140), such as notification data server. This remote server need not be the same server used to provide map data, but can rather be any server that serves images or other notification data that the human user wishes to see when entering a particular geofenced region.

Once the information has been loaded into memory, such as (110), the system may then be used to provide suitable location-based notifications to the user. This process is shown in FIG. 2 and FIG. 17 to FIG. 18.

Figure 2:
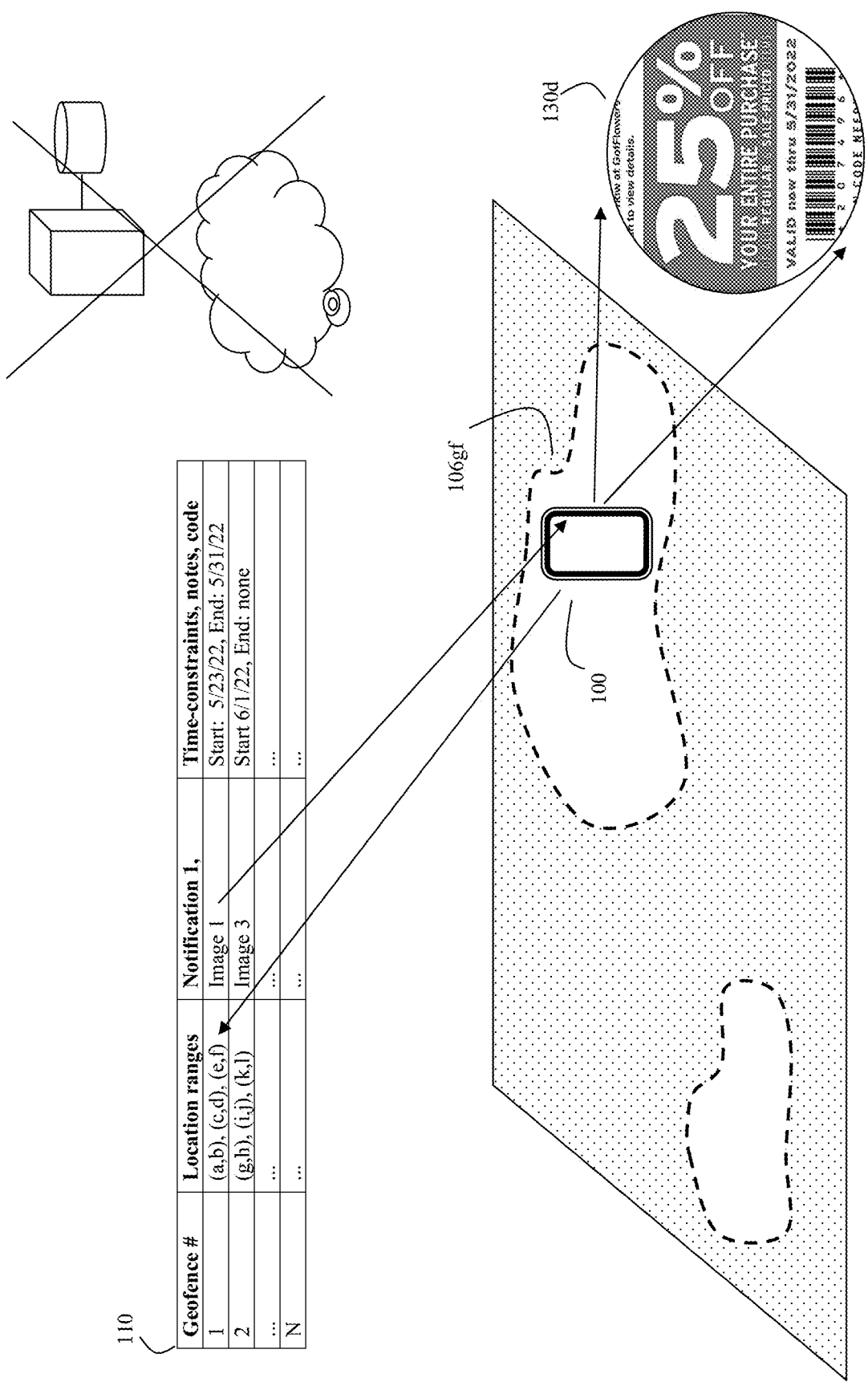
FIG. 2 shows how when a user carries the system's handheld computerized device into a previously designated geofenced region, the system will determine the device's present location, and automatically compare this to the various geofenced regions stored in memory.

FIG. 2 shows how when a user carries the system's handheld computerized device (100) into a previously designated geofenced region (here 106gf, which has the same shape as previously user drawn region 106 shown in FIG. 1), the system will obtain the device's present location, and automatically compare this to the various geofenced regions (location ranges) stored in memory (110). When there is a match, the system will then determine if there are any associated notifications (such as image 1) that also satisfy any previously entered time constraints. If so, the system will then output that the relevant notification data is at least available. Often, the actual notification data will be output as well. This can be done by, for example, displaying the previously entered notification data image (from FIG. 1, here shown as 130d) on the system's display screen (102). Note that a remote server is not necessarily required here. Thus, in some embodiments, complete or nearly complete user privacy can be preserved.

Nonetheless, even though the system does not necessarily require a remote server to operate, in some embodiments, the system can nonetheless provide a privacy enhanced method of providing a direct connection between the user (as a potential buyer) and a merchant or other provider of the notification data (e.g., image 130). This is because the notification data can also contain merchant contact information, such as merchant email, URL, and the like, and the user can authorize the system to electronically contact the merchant.

Thus, in some embodiments, the system will use its at least one processor, and it's at least one location sensor (such as the previously discussed GPS sensor), to determine if the handheld computerized device (100) is presently located within at least one geofenced region (such as 106gf) previously associated with notification data (such as image 130), thus determining relevant notification data.

Then, for those relevant notification data that either not associated with time constraints, or for those relevant notification data that are associated with presently satisfied time constraints (as determined by the device's clock-calendar), then automatically at least outputting that the relevant notification data is available. This output doesn't need to be the actual notification data itself, although it can be. It can also be a mere signal that the notification data is available. If the user receives this prompt, then the system can then provide the notification data upon further user queries.

In some embodiments, the system may further use its at least one processor to output this relevant notification on the devices touch-sensitive display screen (102), as shown in FIG. 2 (130d).

Alternatively, or additionally, the device might instead use its at least one processor to output any of an audio sound (such as a beep), haptic signal (such as vibration), or a radio frequency signal (intended for another computerized device) that the relevant notification data is available.

For example, the system may be configured to transmit a radio frequency notification signal (such as a Bluetooth signal) to another (second) computerized device, such as a user worn smart watch (for an example, an Apple iWatch) that relevant notification data is available. The user can then receive an audio signal, vibrational signal, or visual signal that the relevant notification data is available. Indeed, in some embodiments, some or all of the notification data may be transmitted to the second computerized device, in which case the user can receive the notification data on the second computerized device as desired.

Although in a preferred embodiment, the notification data will usually be an image, such as the user entered images previously described, other types of notification data are not disclaimed. In some alternative embodiments, the notification data can be any of image data, sound data, one or two-dimensional bar code data, electronic key data, or other type of analog or digital code. Electronic contact information, such as email, URL and the like, may also be so encoded. Each of these types of notification data can have their own optional time constraints and optional user comments.

FIG. 17 shows that when the system determines that it is now located within one of the previously geofenced regions that are also associated with notification data, the system will check the associated time constraints (if any). When the time constraints (if any) are also satisfied, the system will then output that relevant notification data is available. Here the output takes the form of a small visual alert at the top of the screen, along with a prompt to push for further details. As previously discussed, other types of alerts, such as various sounds, vibrations, and radio frequency messages (such as Bluetooth messages to another device such as a computerized watch) may also be done.

FIG. 18 shows that, either immediately, or upon further user inquiry, the system can then provide the notification data image previously stored in memory. In this example, the image is a time limited coupon (previously shown in FIG. 2, 130d) and the coupon image also contains a one-dimensional bar code.

FIG. 18 also shows that merchants or other entities that face the challenge of poor performing locations/stores can also use the system's geo fence approach to attach specific promotions to their specific locations or stores.

As another example, consider a department store, such as Target Corporation. Target may desire to offer special sales only at its Milpitas location on Thursdays, while still respecting user privacy. In some embodiments, Target may encode the Milpitas geofence data and time data onto a code (such as a 1 or 2-dimensional bar code), and the user can allow their system to store this location and time data at the time of scanning the bar code.

The system will then keep track of the time and location, and a user who has opted in for alerts from Target when in the vicinity of the Milpitas store will receive the alert. Alternatively, the code may contain an email, URL or other information enabling and authorizing the merchant (e.g., Target) to now send push notifications to the user's smartphone when the user is at the appropriate real world (or virtual world) location. With appropriate user permissions, this can also enable alerts, while still preserving user privacy.

Other Automated Embodiments

In some embodiments, with appropriate user permissions, the system may be further configured to automatically keep track of user visits to certain geofenced locations, and to even automatically generate certain types of user notifications. These user notifications can include automated coupons or tickets if a user visits a different organization location, for example.

To do this, either the previously discussed remote map server (140) or an alternate remote notification data server can be configured to store downloadable executable code that is associated with (in the server memory) at least some of the map data or notification data.

On the handheld computerized device, the device's at least one processor is further configured to, when any of the map data or remote notification data is downloaded, also download this executable code and further associate this executable code with at least some of the geofenced regions in memory (110). Here the code field in (110) may be used.

Like before, the handheld devices' at least one processor can be further configured to use its at least one location sensor to determine if the handheld computerized device is presently located within at least one geofenced region previously associated with notification data. However, in this embodiment, if the executable code is present (110), then the processor will also run this executable code.

This executable code can then (again with appropriate user permissions) optionally direct the device to accumulate and/or transmit visit statistics, offer to automatically create new geofenced regions, and offer to automatically generate additional notification data. If the user accepts these offers, then, if the user walks into a related location, the system can automatically generate notification data that is suitable for this related location.

"Metaverse" and "Virtual World" Features

The "metaverse" is often defined as being "a virtual-reality space in which users can interact with a computer-generated environment and other users." In the course of using the present invention, the system ends up creating a virtual reality space or "metaverse", populated with various map coordinates, geofenced regions, and location specific notification data, that can be a useful subset of the user's real-world environment.

As a result, a user can virtually travel to a given map coordinate on the system (perhaps by touching a map location on a touch sensitive screen). If the system has relevant geofences and location specific notification data present in memory, the system can retrieve this location specific notification data and present it to the user. If the user had also authorized the system to establish connections with a merchant or other entity at that given location, then the entity can in turn provide additional notifications to the user. The system can be configured so that the merchant or other entity can provide these additional notifications when the user either at that physical location, or at that virtual location (or both).

Thus, for example, a user who is a gym member may approach their gym's virtual location in the "virtual world" or "metaverse", (often by touching a location on the user's touch sensitive smartphone display screen), and the system can then let the user know that a "real world" training session or fitness challenge is available at that gym.

The invention claimed is:

1. A computerized method of providing location-based notifications, said method comprising:
    displaying, on a handheld computerized device comprising at least one processor, memory, touch-sensitive display screen, a clock-calendar, video camera, and at least one location sensor; a map of a geographic area on said touch-sensitive display screen;
    said map of said geographic area comprising a plurality of map coordinates;
    inputting using said touch-sensitive display screen, and said at least one processor, at least one geofenced region by, for at least some of said at least one geofenced regions:
    manually drawing a closed curve shape determining boundaries of at least one manually drawn geofenced region on said map, and using said at least one processor, said closed curve shape, and at least some of said map coordinates to store said boundaries of said at least one geofenced region in said memory;
    inputting location specific notification data, and using said at least one processor to associate, in said memory, at least some of said location specific notification data with at least some of said geofenced regions in said memory;
    said at least one processor further configured to use said video camera to obtain at least some location specific notification data comprising any of image data and one or two-dimensional bar code data;
    for at least some of said location specific notification data, further using said at least one processor and said touch-sensitive screen to input time constraints, and to associate said time constraints with said location specific notification data;
    determining relevant notification data by using said at least one processor, and said at least one location sensor, to determine if said handheld computerized device is presently located within at least one geofenced region previously associated with notification data; and
    for those relevant notification data that are not associated with time constraints and those relevant notification data that are associated with time constraints within said clock-calendar, then using said at least one processor to output that said relevant notification data is available;
    wherein said method operates without contacting a remote server.

2. The method of claim 1, further using said at least one processor to output said relevant notification on said touch-sensitive display screen.

3. The method of claim 1, further using said at least one processor to output any of an audio, haptic, or radio frequency signal that said relevant notification data is available.

4. The method of claim 3, further using a second computerized device to receive said radio frequency signal, and using said second computerized device to output any of said relevant notification data, or any of an audio, haptic, or visual signal that said relevant notification data is available.

5. The method of claim 1, wherein, for at least some of said geofenced regions, said location specific notification data obtained from said video camera comprises a plurality of images or one or two-dimensional bar code data, and each of said plurality of images or one or two-dimensional bar code data has their own time constraints.

6. The method of claim 1, further using said at least one processor and said touch sensitive display screen to receive text input pertaining to any of an address or geographical location, and using said text input to retrieve said map.

7. The method of claim 6, wherein said handheld computerized device further comprises any of a cellular or Wi-Fi transceiver, and said at least one processor uses said text input and said cellular or Wi-Fi transceiver, and the internet, to query a remote map server for map data, and to retrieve said map from said remote map server; or
    wherein said handheld computerized device further comprises any of a cellular or Wi-Fi transceiver, and said handheld computerized device further uses said at least one processor, said cellular or Wi-Fi transceiver, and the internet to obtain said relevant notification data from a remote notification data server.

8. The method of claim 7, wherein any of said remote map server and said remote notification data server further associates executable code with at least some of said map data or notification data;
    using said at least one processor to download said executable code and further associate said executable code with at least some of said geofenced regions in said memory;
    further using said at least one processor, and said at least one location sensor, to determine if said handheld computerized device is presently located within at least one geofenced region previously associated with relevant notification data, and if said executable code is present, then also running said executable code.

9. The method of claim 1, wherein said display further comprises a virtual reality display.

10. A computerized system for providing location-based notifications, said system comprising:
    a handheld computerized device comprising at least one processor, memory, touch-sensitive display screen, a clock-calendar, video camera, and at least one location sensor configured to display a map of a geographic area on said touch-sensitive display screen;
    said map of said geographic area comprising a plurality of map coordinates;
    said touch-sensitive display screen, and said at least one processor configured to accept input comprising a manually drawn closed curve shape designating at least one geofenced region for at least some of said at least one geofenced regions, thus determining boundaries of at least one manually drawn geofenced region on said map;

said at least one processor configured to use said closed curve shape, and at least some of said map coordinates to store said boundaries of said at least one geofenced region in said memory;

said at least one processor further configured to receive location specific notification data, and to associate, in said memory, at least some of said location specific notification data with at least some of said geofenced regions in said memory;

obtaining, using said video camera, at least some location specific notification data, comprising any of image data and one or two-dimensional bar code data;

said at least one processor and said touch-sensitive screen further configured, for at least some of said location specific notification data, to receive input time constraints, and to associate said time constraints with said location specific notification data;

said at least one processor configured to determine relevant notification data by using location data from said at least one location sensor to determine if said handheld computerized device is presently located within at least one geofenced region previously associated with notification data; and for those relevant notification data that are not associated with time constraints and those relevant notification data that are associated with time constraints within said clock-calendar, then to output that said relevant notification data is available;

wherein said system performs the above operations without contacting a remote server.

11. The system of claim 10, wherein said at least one processor is further configured to output said relevant notification on said touch-sensitive display screen.

12. The system of claim 10, further said at least one processor is further configured to output any of an audio, haptic, or radio frequency signal that said relevant notification data is available.

13. The system of claim 12, further comprising a second computerized device configured to receive said radio frequency signal, and use data encoded in said radio frequency signal to output any of said relevant notification data, or any of an audio, haptic, or visual signal that said relevant notification data is available.

14. The system of claim 10, wherein, for at least some of said geofenced regions, said location specific notification data obtained from said video camera comprises a plurality of images or one or two-dimensional bar code data, and each of said plurality of images or one or two-dimensional bar code data has their own time constraints.

15. The system of claim 10, wherein said at least one processor and said touch sensitive display screen are further configured to receive text input pertaining to any of an address or geographical location, and to said text input to retrieve said map.

16. The system of claim 15, wherein said handheld computerized device further comprises any of a cellular or Wi-Fi transceiver, and said at least one processor is further configured to use said text input and said cellular or Wi-Fi transceiver, and the internet, to query a remote map server for map data, and to retrieve said map from said remote map server; or wherein said handheld computerized device further comprises any of a cellular or Wi-Fi transceiver, and said handheld computerized device is further configured use said at least one processor, said cellular or Wi-Fi transceiver, and the internet to obtain said relevant notification data from a remote notification data server.

17. The system of claim 16, wherein any of said remote map server and said remote notification data server are configured to store downloadable executable code associated with at least some of said map data or notification data;

said at least one processor further configured to download said executable code and further associate said executable code with at least some of said geofenced regions in said memory;

said at least one processor further configured to use said at least one location sensor to determine if said handheld computerized device is presently located within at least one geofenced region previously associated with relevant notification data, and if said executable code is present, then to also run said executable code.

* * * * *